United States Patent [19]

Zeides

[11] Patent Number: 4,636,143
[45] Date of Patent: Jan. 13, 1987

[54] PROPELLER FOR GASEOUS AND FLUIDIC MEDIA

[76] Inventor: Otto Zeides, Lehnbachweg 10, 7410 Metzingen, Fed. Rep. of Germany

[21] Appl. No.: 750,876

[22] Filed: Jul. 1, 1985

[30] Foreign Application Priority Data

Jun. 29, 1984 [DE] Fed. Rep. of Germany ....... 3424010

[51] Int. Cl.[4] ............................................... F01D 5/14
[52] U.S. Cl. ................................ 416/228; 416/227 A; 416/231 B
[58] Field of Search ........... 416/223 R, 228 R, 228 A, 416/231 R, 231 A, 231 B, 235, 234, 236 R, 500, 227 A; 415/119

[56] References Cited

U.S. PATENT DOCUMENTS

| | | | |
|---|---|---|---|
| 1,742,792 | 1/1930 | Stahl | 416/227 A X |
| 1,804,434 | 5/1931 | Reed | 416/228 |
| 2,514,487 | 7/1950 | Griese | 416/231 B X |
| 3,044,559 | 7/1962 | Chajmik | 416/228 |

FOREIGN PATENT DOCUMENTS

| | | | |
|---|---|---|---|
| 459204 | 4/1928 | Fed. Rep. of Germany | 416/231 B |
| 867498 | 2/1953 | Fed. Rep. of Germany | . |
| 2307125 | 11/1976 | France | 416/231 B |
| WO82/02694 | 8/1982 | PCT Int'l Appl. | 416/231 B |
| 15835 | of 1909 | United Kingdom | 416/228 |
| 779591 | 11/1980 | U.S.S.R. | 416/228 |

Primary Examiner—Robert E. Garrett
Assistant Examiner—Joseph M. Pitko
Attorney, Agent, or Firm—Michael J. Striker

[57] ABSTRACT

A propeller for gaseous and fluidic media, particularly an air propeller which is formed with at least one vane mounted to a hub of the propeller and rotatable about a central axis of the propeller. The vane includes two blades extended in the radial direction of the vane. The blades are spaced from each other by an elongated slot formed in the vane and extended in the radial direction of the vane. The slot has the length which is about 40 to 50% of the length of the radius of the vane, defined between the center of rotation of the vane and its tip.

13 Claims, 5 Drawing Figures

PROPELLER FOR GASEOUS AND FLUIDIC MEDIA

BACKGROUND OF THE INVENTION

The present invention relates to a propeller for gaseous and fluidic media, particularly an air propeller.

Air propellers of the foregoing type normally have at least one rotatable vane. An air propeller disclosed in DE-PS 867,498 has a vane comprised of two propeller blades. These blades are spaced from each other and have a common shaft to which the blades are connected. Both propeller blades in this known air propeller extend parallel to each other whereby the central axis of elongation of the vane lies approximately in the middle of the distance between the blades. The propeller is formed as an adjusting propeller, in which acting centrifugal moments, due the above described construction, are substantially reduced or totally eliminated. The disadvantage of this otherwise satisfactory known propeller resides in that the individual blades which extend right from the center of rotation of the propeller of the vane as very thin blades are subjected to high centrifugal forces and thus high loads, particularly when the vane is rotated with high speeds. In the region of the blades, axial dimensions are twice as great as those of the single-vane air propeller; this can be also a serious disadvantage.

No increase in a thrust value and thus no load increase can be obtained with the above described conventional adjusting propeller. Sound emission of such a propeller exceeds permissible values.

SUMMARY OF THE INVENTION

It is an object of the present invention to provide an improved propeller for gaseous and fluidic media, particularly an air propeller.

It is another object of the invention to provide an air propeller which is light and inexpensive to make.

It is yet another object of this invention to provide an impeller which would have axial and radial dimensions, which would practically not exceed those of conventional air propellers but would ensure considerably higher push or thrust values and reduced noise.

These and other objects of the invention are attained by a propeller for gaseous or fluidic media, particularly an air propeller, comprising at least one vane which includes at least two individual propeller blades extended at a radial distance from a center of rotation of the propeller, said propeller blades being spaced from each other so as to form a gap therebetween, said vane being formed with an elongated slot constituting said gap and forming said individual propeller blades, said vane having a tip, said slot starting at a distance from said center and extending to said tip and being of 40 to 50% of the length of a radius of said vane, defined between said center and said tip, whereby the length of the blades is about 40 to 50% of the length of said radius.

The invention is based on the consideration that push or thrust forces generated by the propeller are of considerable value only at the second radial half of the propeller, and measures have been taken to increase thrust forces in the region of the first radial half of the propeller; these measures, however have been rather costly and led to increased weight and material consumption. The known measures, however, did not result in a considerable improvement of push force values.

For these reasons the propeller of the present invention is unchanged in the first radial half of the propeller as in a conventional propeller of the foregoing type whereby the construction of the proposed propeller is as stable and as adjustable as that of the known propeller. Small axial dimensions of the propeller also remained unchanged. The hub of the propeller has the same axial size as the known propeller with a single vane.

The inventive improvement of the present invention resides in that the substantially shorter individual blades of the vane are not subjected to very high centrifugal forces and vibrations as the conventional blades which are twice as long. Due to the fact that the propeller blades of the vane occupy only one half of the radial dimension of the vane a substantial increase of thrust forces and thereby a higher load coefficient are obtained. The utilization of the air propeller of this invention for air planes result in improved flying qualities. Furthermore, small stream losses with a considerably reduced noise generation are obtained. The noise reduction can reach about 100%.

The air propeller of the present invention is light, inexpensive to make; its axial and radial dimensions are small so that it can be employed in many installations.

It is understandable that the propeller according to the present invention can be utilized in windmills, ventilators or like helical propellers in a free stream of air or in the propellers for propelling fluids.

A remaining portion of said vane may be of about 50 to 60% of the length of said radius, said remaining portion being formed as a slot wing.

The slot may extend in a cross-section approximately parallel or at an acute angle to a chord of a non-divided profile of said vane. Therefore a two-stage acceleration can be obtained by the two blades in operation. The acceleration in the first stage is attained by the blade which extends forwardly in the peripheral direction of the vane while in the second stage the acceleration is provided by the second blade. By means of the slot formed between two blades the vortex and stream cavitation, normally occurring at the suction side at the rear edge of the vane, are prevented and mainly a laminar air stream is provided. This leads to a load capacity increase and noise reduction. Furthermore, a greater adjusting angle can be selected on the blades without the danger that stream cavitation may occur at the suction side of the vane. Thus higher speeds are allowed for the propeller. A further noise reduction is due to smaller stream losses at the tips of the blades.

The blades may extend in a cross-section along a chord of a non-divided profile of said vane one after another.

The blades may at least slightly overlap each other.

One of said blades may have in a cross-section a greater positive adjusting angle than that of the other of said blades.

The adjusting angle of said one blade may be by about between 1° to 5° greater than the adjusting angle of the other blade.

Said one blade may be shorter than the other blade.

Said one blade may be by between 3 to 10% of a double radius smaller than a radius of the other blade.

Both said blades have tips and may be supported at said tips one below the other and be connected each other.

The novel features which are considered as characteristic for the invention are set forth in particular in the appended claims. The invention itself however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
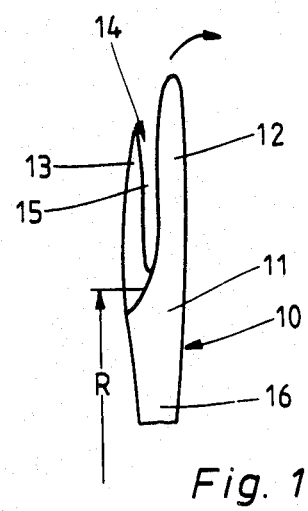
FIG. 1 is a schematic perspective view of the vane portion of the propeller according to the invention.

Referring now to the drawings in detail, an air propeller 10 includes at least one vane 11. Such air propellers in the majority of cases are double-vane constructions which are composed of two vanes 11 which are both made integral with a common hub and extend in the direction of the diameter of the propeller. The present invention is not limited to a one-vane propeller since two, three or even multiple-vane propeller can be formed with the vanes similar to vane 11.

Vane 11 includes at least two propeller blades 12 and 13 which are radially spaced from a center of rotation. Propeller blades 12 and 13 are formed such that they constitute a space or gap 14 therebetween.

Vane 11 is slotted so that a slot 15 is formed between individual propeller blades 12 and 13. This slot 15 takes about 40 to 50% of the radial distance of the vane 11 from the non-illustrated center of rotation, also with radius R. The non-slotted remaining vane shaft 16 has up to the non-shown hub a conventional shape which is knwon for air propellers with, for example double vanes. Due to the extension of the slot by about 40 to 50% of the whole radius such a bifurcation results that the remaining forked portion of vane 11 is formed as a slotted wing whereby the radial extension of slot 15 and of the so formed slotted wing takes about 50 to 60% of the radius of vane 11.

Figure 4:
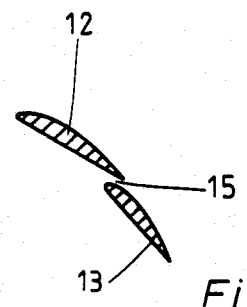
FIG. 4 is a sectional view taken along line IV—IV of FIG. 2.
Figure 5:
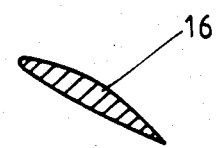
FIG. 5 is a sectional view taken along line V—V of FIG. 2.
Figure 2:
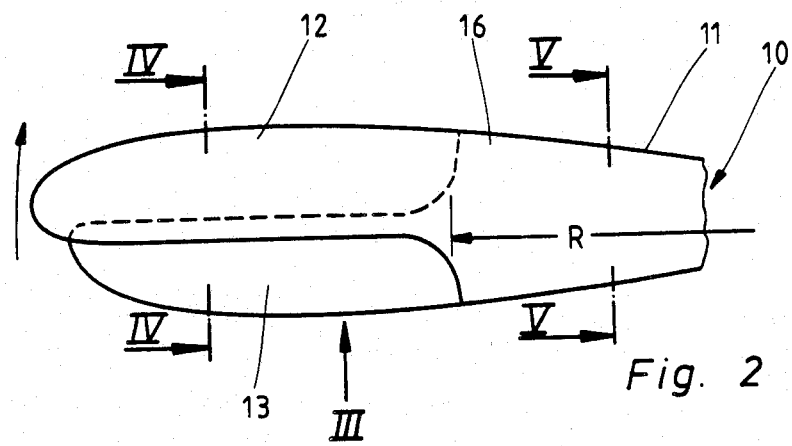
FIG. 2 is a side view of the vane portion of FIG. 1, on an enlarged scale.
Figure 3:
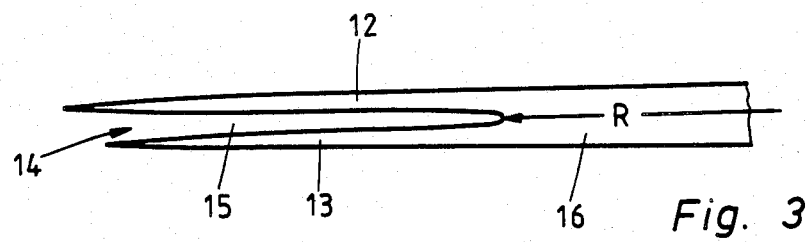
FIG. 3 is a view of the vane portion as seen in the direction III of FIG. 2.

In the region of shaft 16, as shown in FIG. 5, the slot 15 extends such that it is approximately parallel to or extends at an acute angle to the chord of the non-divided vane profile. The individual blades 12 and 13 are arranged along the profile chord of the non-divided vane profile one after another. This can be clearly seen in FIG. 4. Thereby two propeller blades 12 and 13 partially overlap each other at least insignificantly so that the front end of the right-hand or rear blade 13 in FIG. 4 is overlapped by the rear end of the front or left-hand blade 12.

The whole vane 11 is a one-piece element. Both vane blades 12 and 13 are constituted at the end of the radial region R by, for example working out the slot 15 from the material of the vane 11. It is therefore clear that this can be carried out on such a blade in which slot 15 can be worked or machined and two individual blades would be formed so that the vane would have the shape of the double-blade structure.

As clearly seen in FIG. 4 the rear blade 13 has a greater positive adjusting angle than that of the front blade 12. The adjusting angle of the rear or second blade 13 is by between 1° and 5°, particularly from 2° to 3°, in the positive direction, greater than the adjusting angle of the front or first blade 12.

One of the blades is shorter than the other blade. In the exemplified embodiment the second blade 13 is shorter in the radial direction of the vane than the first blade 12. In the peripheral direction, indicated by arrow 17, the shorter blade 13 can lie in front or behind the longer blade 12.

The radius of the shorter blade 13 is by between 3° to 10°, particularly 4° to 5° (double half-diameter or double R) shorter than the radius of the longer blade 12.

In another non-shown embodiment blades 12, 13 can be supported at their tips one below the other and can be connected to each other.

It is, of course, understood that the shaft 16 of the vane can be arranged in the conventional manner as a shaft rotationally adjustable about its axis of elongation or as a fixedly adjustable shaft.

The shape of the air propeller according to this invention provides the following advantages:

Two blades 12 and 13 cause the two-stage acceleration. The first acceleration stage is effected by the front blade 12 while the second acceleration stage is caused by the rear blade 13. Apertural effect is therefore obtained by two spaced blades 12 and 13. On the other hand, in the region of the rear edge of the profile and at its suction side no vortex with stream cavitation form at the suction side on the rear edge of the first blade 12. Due to the slot 15 and resulting second blade 13 the vortex formation is prevented, and a laminar, loss-free air stream is obtained. Because danger is avoided or at least substantially reduced and the air stream at the suction side is broken greater adjusting angles and thus higher speeds are possible for the blades 12, 13. The invention makes use of the fact that a pushing force-distribution produces over the radial region of the air propeller 10, particularly about 40 to 45% of the radius, considerable pushing forces which are used mainly for propulsion. Due to the subdivision of the vane 11 in the radial region R into two blades 12 and 13 by the slot 15 a considrable increase of generated pushing forces takes place. Therefore a higher load coefficient is obtained. All this leads to better propelling properties of the airplane.

A further important advantage of the two-blade vane of the invention resides in that only very small marginal losses occur at the tips of the blades 12 and 13 and thus a noise generation is significantly reduced. Noise reduction obtained in the arrangement corresponds to a non-dangerous value of 5.5 dB. The length of the blades 12 and 13 can be reduced because an induced resistance in the region of these blades is smaller. A further advantage of the air propeller of this invention resides in that despite the favorable load capacity of this propeller costs of manufacturing of such a propeller are not significantly higher than those for conventional air propellers. At any rate costs of manufacturing of the propeller of the present invention are substantially lower than the costs of making a double air propeller. Also, weight of the air propeller 10 is substantially reduced as compared to known air propellers of this type. The axial length of the air propellers proposd herein is not higher than that of known propellers although there is a radially widened portion in the region of the hub and along the vane. The structure of the proposed propeller ensures that substantially higher loads with extremely reduced noise developments can be obtained at low speeds of the propeller as compared to conventional air propellers. It is advantageous to utilize the air propeller of the present invention for an ultra-lightweight airplane because it would be then possible to fall below a required limit of sound emission of maximum 60 dB.

It will be understood that each of the elements described above, or two or more together, may also find a useful application in other types of propellers differing from the types described above.

While the invention has been illustrated and described as embodied in a propeller, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A propeller for gaseous or fluidic media, particularly an air propeller, comprising at least one vane having a tip and including at least two complete, individual elongated propeller blades extended at a radial distance from a center of rotation of the propeller, said propeller blades being spaced from each other in the direction transverse to a radial direction of the propeller so as to form a gap therebetween, said vane being formed with an elongated slot constituting said gap and forming said individual propeller blades, said slot starting at a distance from said center and extending to said tip and being of 40 to 50% of the length of a radius of said vane defined between said center and said tip, one of said blades having in a cross-section a greater positive adjusting angle than that of the other of said blades, said one blade being shorter than the other blade, whereby a two-stage acceleration is provided by said vane and a laminar loss-free media stream is obtained.

2. The propeller as defined in claim 1, wherein a remaining portion of said vane is of about 50 to 60% of the length of said radius, said remaining portion being formed as a slot wing.

3. The propeller as defined in claim 1, wherein said slot extends in a cross-section approximately parallel to a chord of a non-divided profile of said vane.

4. The propeller as defined in claim 1, wherein said slot extends in a cross-section at an acute angle to a chord of a non-divided profile of said vane.

5. The propeller as defined in claim 1, wherein said blades extend in a cross-section along a chord of a non-divided profile of said vane one after another.

6. The propeller as defined in claim 1, wherein said blades at least slightly overlap each other.

7. The propeller as defined in claim 6, wherein said blades have tips and are supported at said tips one below the other and are connected to each other.

8. The propeller as defined in claim 1, wherein the adjusting angle of said one blade is by about between 1° to 5° greater than the adjusting angle of the other blade.

9. The propeller as defined in claim 8, wherein the adjusting angle of said one blade is by 2° to 3° greater than the adjusting angle of the other blade.

10. The propeller as defined in claim 1, wherein a radius of said one blade is by between 3 and 10% of a double radius smaller than a radius of the other blade.

11. The propeller as defined in claim 10, wherein the radius of the one blade is by 4 to 5% of a double radius smaller than the radius of the other blade.

12. A propeller for gaseous or fluidic media, particularly an air propeller, comprising at least one vane having a tip and including at least two complete, individual elongated propeller blades extended at a radial distance from a center of rotation of the propeller, said propeller blades being spaced from each other in the direction transverse to a radial direction of the propeller so as to form a gap therebetween, said vane being formed with an elongated slot constituting said gap and forming said individual propeller blades, said slot starting at a distance from said center and extending to said tip and being of 40 to 50% of the length of a radius of said vane defined between said center and said tip, said slot extending in a cross-section at an acute angle to a chord of a non-divided profile of said vane.

13. A propeller for gaseous or fluidic media, particularly an air propeller, comprising at least one vane having a tip and including at least two complete, individual elongated propeller blades extended at a radial distance from a center of rotation of the propeller, said propeller blades being spaced from each other in the direction transverse to a radial direction of the propeller so as to form a gap therebetween, said vane being formed with an elongated slot constituting said gap and forming said individual propeller blades, said slot starting at a distance from said center and extending to said tip and being of 40 to 50% of the length of a radius of said vane defined between said center and said tip, said blades at least slightly overlapping each other, one of said blades having in a cross-section a greater positive adjusting angle than that of the other of said blades, said one blade being a front blade as seen in the direction of rotation of the propeller and the other blade being a rear blade as seen in said direction of rotation, said rear blade being shorter than said front blade.

* * * * *